No. 844,894. PATENTED FEB. 19, 1907.
L. RENAULT.
CARBURETER.
APPLICATION FILED MAY 29, 1905.
4 SHEETS—SHEET 1.
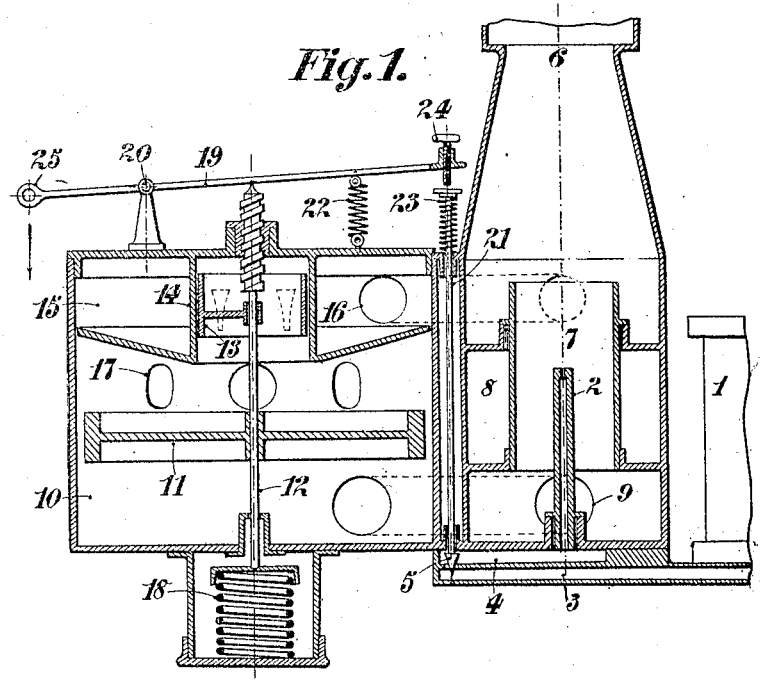
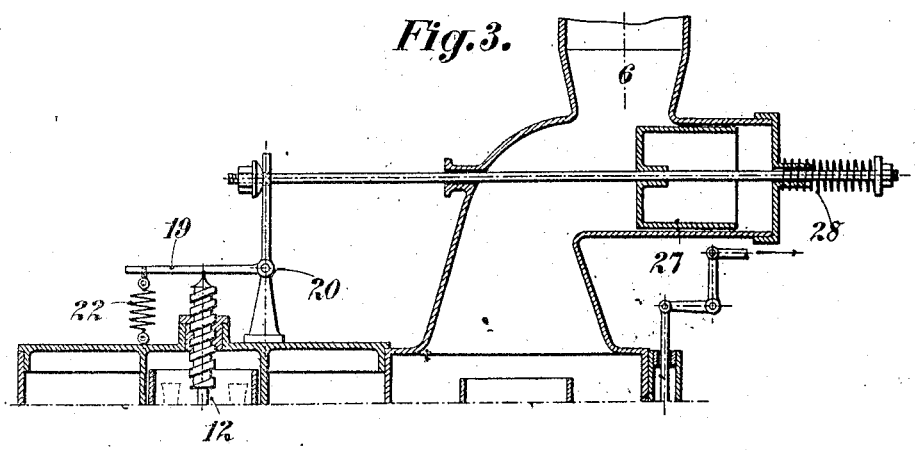
Witnesses: Inventor
Louis Renault
By
James L. Norris
Atty

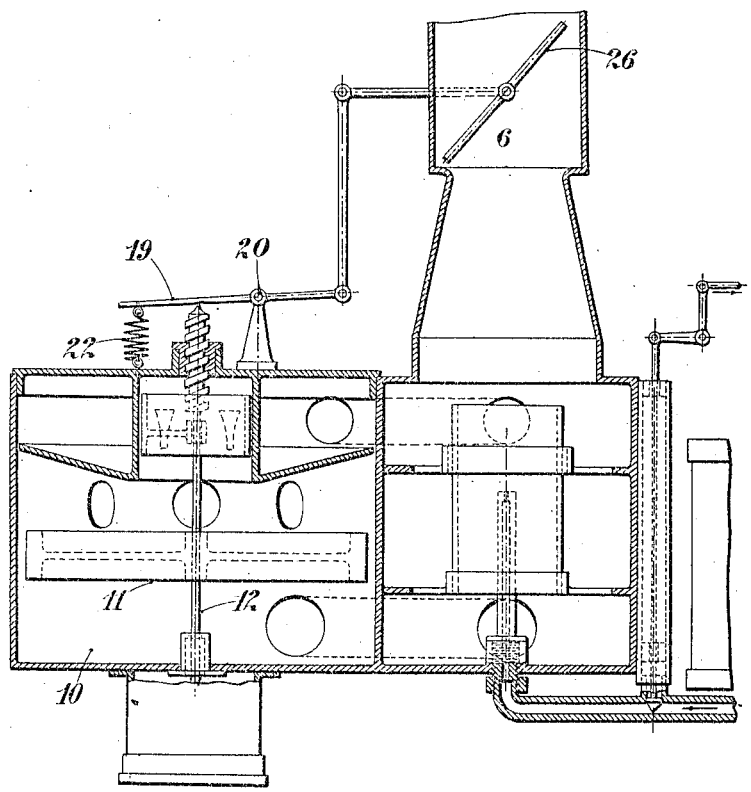

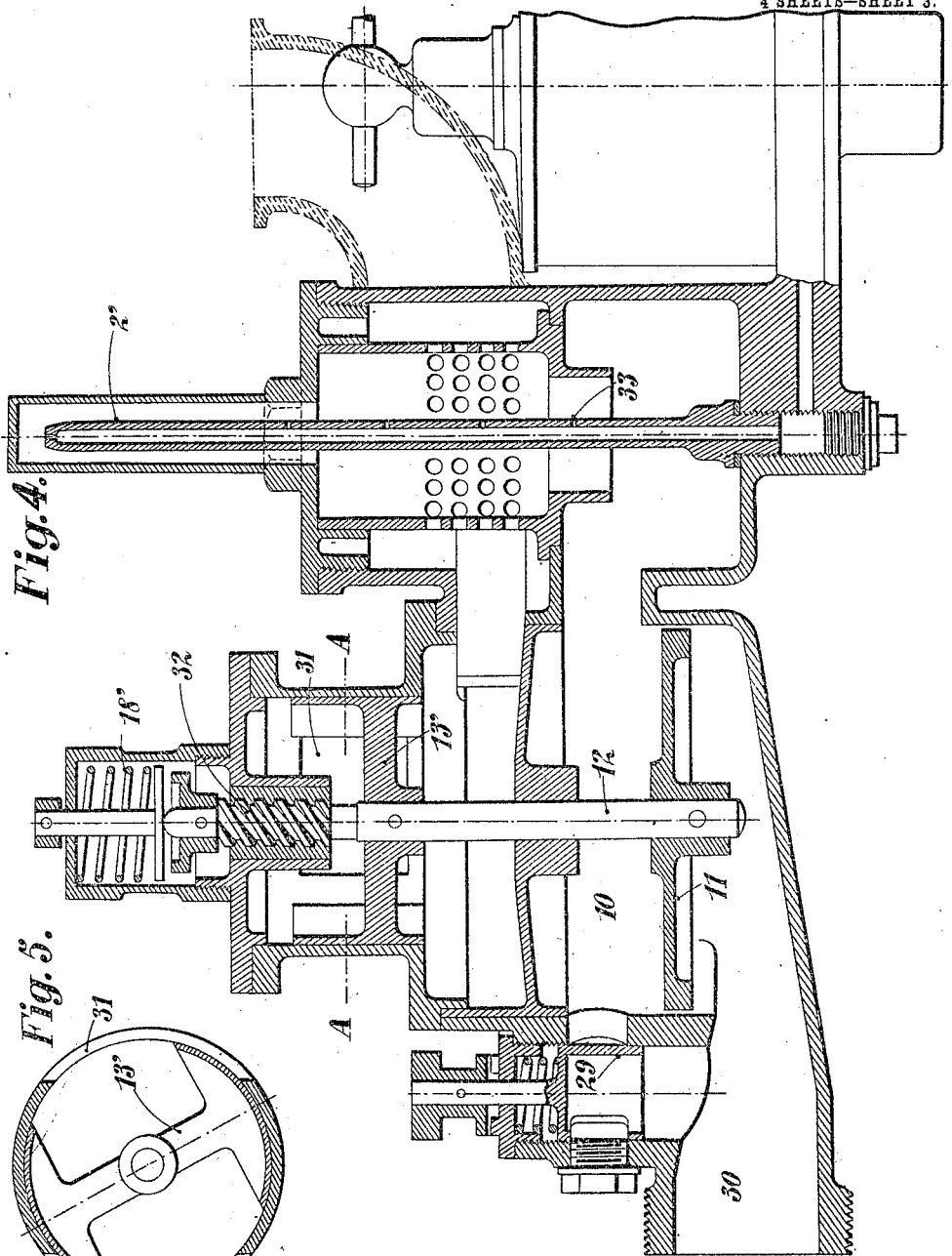

No. 844,894.
PATENTED FEB. 19, 1907.
L. RENAULT.
CARBURETER.
APPLICATION FILED MAY 29, 1905.
4 SHEETS—SHEET 4.
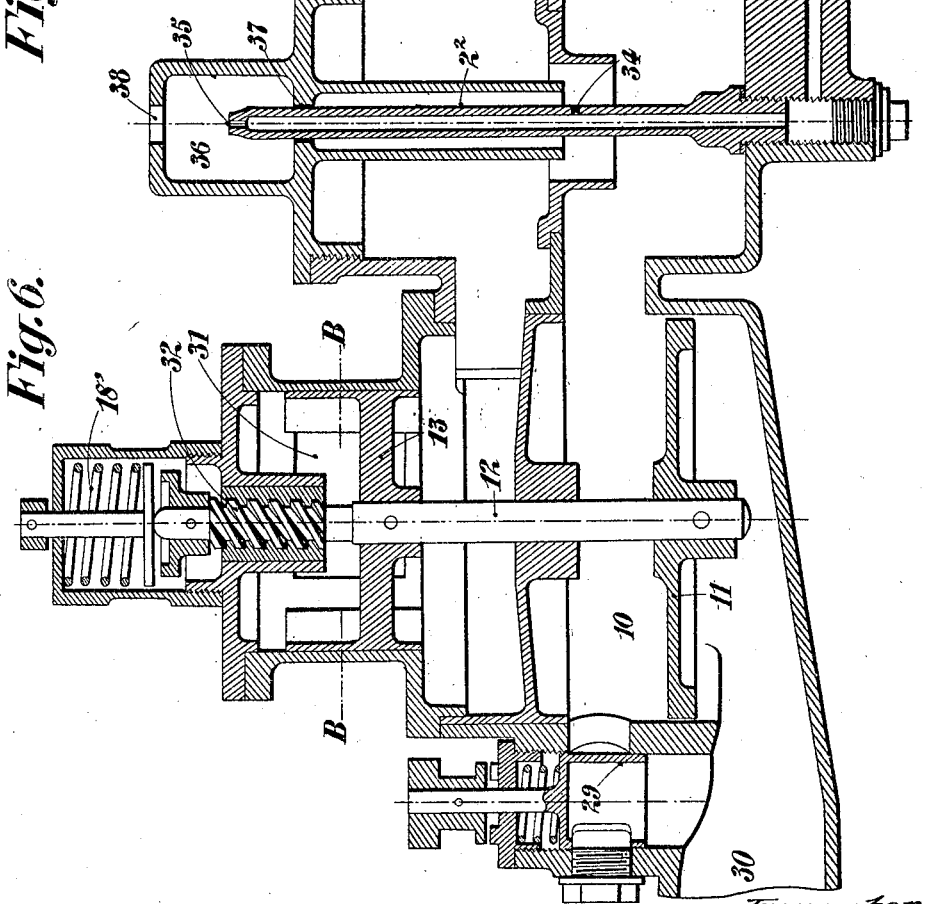

UNITED STATES PATENT OFFICE.

LOUIS RENAULT, OF BILLANCOURT, FRANCE.

CARBURETER.

No. 844,894.  Specification of Letters Patent.  Patented Feb. 19, 1907.

Application filed May 29, 1905. Serial No. 262,887.

*To all whom it may concern:*

Be it known that I, LOUIS RENAULT, a citizen of the French Republic, residing at Billancourt, Seine, France, have invented certain new and useful Improvements in Carbureters, of which the following is a specification.

This invention has for its object to provide, in connection with the carbureter of an internal-combustion oil-engine, a regulating device operated by the vacuum produced by the engine in the passage supplying air to the carbureter instead of by the vacuum created in the carbureter itself.

According to this invention in the suction-passage by which air is supplied to the carbureter is arranged a disk or equivalent device for regulating the available airway through the said suction-passage, the said disk or the like being subjected to the action of the vacuum produced by the engine, the variations of the vacuum causing the disk or the like to operate to vary the introduction of air. As the movements of the disk or the like are directly proportional to the speed of the engine, it is possible to utilize the said disk or the like for regulating the speed of the engine by causing the said disk or the like to act on a valve, so as to regulate the supply of petrol or other oil (I will refer to it as "petrol") to the spraying-nozzle, or the disk or the like may be caused to operate a regulating device in the suction-pipe of the engine.

In the accompanying drawings, Figure 1 is a vertical section of a carbureter provided with a device in accordance with this invention, and Figs. 2, 3, 4, and 6 illustrate modifications as hereinafter described. Fig. 5 is a section through line A A of Fig. 4. Fig. 7 is a section through line B B of Fig. 6.

The carbureter comprises a reservoir 1 for the petrol, which reservoir is fitted with a float, so that the petrol reaches the spraying-nozzle 2 at a constant level. The petrol passes from the reservoir 1 to the spraying-nozzle 2 through two passages 3 and 4, between which a plug-valve 5 is provided for the purpose of stopping the supply of petrol to the nozzle when required.

The suction-pipe of the engine is connected to the upper part 6 of the mixing-chamber. In the said mixing-chamber is a throttling-tube 7, surrounded by an annular space 8, forming a jacket through which hot water or gases can circulate for the purpose of heating the carbureter. Below the throttling-tube 7 opens a pipe 9, communicating with the lower part of a chamber 10, which contains the aforesaid disk 11, which occupies so much of the cross-sectional area of the said chamber 10 as to leave only a small space between the rim of the disk and the wall of the chamber, the cross-sectional area of which said space being equal to or less than the cross-sectional area of the aforesaid throttling-tube 7. In this manner all the variations of the vacuum produced by the engine are transmitted to the said disk 11, which is mounted on a spindle 12, carrying a hollow piston 13, capable of sliding in a cylinder 14 in the upper part of the aforesaid chamber 10, which is separated from the lower part by a division, the said cylinder 14 being provided with openings which can be covered and uncovered by the said hollow piston 13. The said openings establish communication between the lower part of the aforesaid chamber 10 and the upper part 15, which is connected by a pipe 16 with the mixing-chamber above the spraying-nozzle 2, through which pipe 16 air is admitted to the mixing-chamber. Between the aforesaid disk 11 and hollow piston 13 the chamber 10 is provided with openings 17, through which external air enters. The upper end of the spindle 12, carrying the disk and hollow piston, is screw-threaded and passes through a screw-nut, so that the disk cannot move vertically without having a rotary motion imparted to it. This arrangement deadens the jerks imparted to the disk 11 by the suction of the engine and causes the disk and hollow piston to move slowly vertically.

The lower end of the spindle 12, carrying the disk and hollow piston, rests on a support pressed upward by a spring 18, which tends to keep the disk in a raised position. On the upper end of the said spindle 12 bears a lever 19, fulcrumed at 20 between its ends and with one end extending over the upper end of the spindle 21 of the aforesaid plug-valve 5, which controls the supply of petrol 10 to the spraying-nozzle, a spring 22 causing the lever 19 to press constantly on the spindle carrying the disk and hollow piston, which under the action of the spring 18 at the lower end thereof tends constantly to rise and to raise the lever 19 against the action of the spring 22, so that the end of the lever 19 is normally kept away from the top of the spindle 21 of the plug-valve.

The operation of the apparatus is as follows: When the motor is at rest, the disk 11 is in its elevated position, while the openings provided in the aforesaid cylinder 14 are closed by the hollow piston 13. The engine during the first strokes of its piston will only draw in the quantity of air that can pass between the disk 11 and the sides of the chamber 10, in which it is situated; but these successive suctions produce a vacuum which tends to depress the disk 11 and its spindle 12, and the downward motion of the spindle 12 operates the hollow piston 13 so as to admit an additional quantity of air to the mixing-chamber, thereby insuring the constancy of the mixture. If the speed of the engine and the descent of the spindle 12 be sufficient, the aforesaid lever 19 is caused by its spring 22 to bear on the upper end of the plug-valve spindle 21, thereby compressing a spring 23, (which spring surrounds the plug-valve spindle and normally keeping the plug-valve open,) and the plug-valve is thereby caused to close the passage through which petrol passes to the spraying-nozzle. A momentary stoppage or decrease of speed takes place, and there is reduced vacuum under the disk 11, which tends to rise again under the action of the spring 18 beneath its spindle. The said spindle on rising again raises the lever 19, so that it ceases to act on the plug-valve spindle 21, which, under the action of its spring 23, rises, and the plug-valve opens, and the petrol can pass again to the spraying-nozzle 2, and at the same time the supply of air is decreased. When the engine regains its speed, vacuum is again created under the disk 11, which again descends with its spindle 12, and so on while the engine is at work.

To make the apparatus adjustable, the end of the lever 19, which acts on the plug-valve spindle 21, is provided with a screw 24, passing through the said end of the lever and acting as the medium for bearing on the plug-valve spindle, so that the time of closing the plug-valve can be varied by operating this screw. The lever on the other side of its fulcrum 20 is extended, and by depressing this extension 25 the lever 19 will be raised, so that the regulating action of the aforesaid arrangement can be suspended when so desired.

In a modified form of the arrangement shown in Fig. 2 the motion of the disk 11 is utilized to operate a butterfly-valve 26, arranged in the suction-pipe 6 of the engine. In this modification when the disk 11 is caused to descend by the suction of the engine-piston the lever 19 (kept in contact with the screwed upper end of the spindle 12 of the disk and hollow piston, as before, by the spring 22) tends to close the aforesaid valve 26 and restrict the admission of the carbureted air to the engine, so that the speed of the engine and the vacuum under the disk 11 are decreased, and the said disk then tends to rise under the action of the spring 18, pressing it upward. The upper end of the spindle 12 of the disk and hollow piston then exerts a thrust on the lever 19 such as to again open the valve 26.

In another modification of the arrangement, Fig. 3, the regulation is effected by means of a drum or piston-valve 27, and the lever 19 is bell-cranked, one arm being kept in contact by a spring 22 with the top of the spindle 12 of the disk and hollow piston, the other arm of the said bell-crank lever actuating the drum or piston-valve 27. When the disk 11 descends under the action of the vacuum created by the engine-piston, the bell-crank lever 19 turns on its fulcrum 20 and causes the drum or piston-valve 27 to contact or close the passage-way through the suction-pipe 6. If the vacuum below the disk decreases, the disk is raised again by the spring 18 below the spindle of the disk and hollow piston, and this causes the lever to turn on its fulcrum, so as to allow the drum or piston-valve to be returned by a spring 28 (surrounding its spindle) to the position in which the suction-pipe 6 is opened more fully.

In the modification shown on Fig. 4 the carbureter is provided with a cock or valve which can be operated to regulate the admission of air to the carbureter without interfering with the automatic action of the carbureter and with means for controlling the additional air-inlets by altering their dimensions simultaneously in each direction. The carbureter is also provided with an improved spraying-nozzle which permits of the hydrocarbon fuel (which I will refer to as "petrol") being supplied proportionally to the power exerted by the motor, all as hereinafter described. I arrange a cock or valve 29 between the air-supply pipe 30 and the chamber 10, in which the aforesaid disk or the like is situated, the said cock or valve permitting of a regulated quantity of air passing from the said supply-pipe 30 to the said chamber 10 without passing between the space between the aforesaid disk or the like 11 and the sides of the chamber 10. The spindle of the disk or the like 11 has keyed on it a valve 13', capable of covering openings 31, provided in the cylinder inclosing this valve. This valve and the disk or the like connected therewith have imparted thereto when they move vertically a helical motion which is effected by means of a quick threaded screw 32 on the spindle 12 engaging in a similarly-threaded nut. A spring 18', bearing on the head of the spindle 12, tends to keep the disk in its lowest position. The spraying-nozzle 2' is of considerable length and is provided with a first or lower aperture 33, situated, say, two or three millimeters above the constant level of the petrol, and above this first or lower aperture the said nozzle has other apertures variable in number and arranged along the said nozzle. These apertures cause the carbureter to be supplied with petrol in quantity varying with the power being exerted by the motor, this variation of such supply resulting from the variation of level produced in the nozzle by the suction of the piston or pistons of the motor. Thus when there is no load on the motor and it runs at low speed the petrol will rise but little in the nozzle, because the suction is very low, and petrol only passes through the lower apertures of the nozzle; but when load is thrown on the motor and its speed increases the suction increases, the petrol rises in the nozzle and passes through the higher apertures as well. The air admitted directly from the air-inlet pipe 30 into the chamber 10 of the disk or the like through the aforesaid cock or valve 29 causes the suction acting on the disk or the like 11 to vary, modifies the movement of the said disk or the like, and causes the apertures 31 in the cylinder in which the aforesaid valve 13' works to be opened so as to admit additional air. The direct admission of air from the air-supply pipe 30 into the chamber 10 of the disk or the like has for its object to vary slightly the proportions of air and petrol, so as to obtain an explosive mixture as perfect as possible under all conditions of altitude and atmospheric temperature and also to correct the differences which exist between different liquid fuels that may be used. The additional entrance of air through the aforesaid cock or valve 29 does not prevent the automatic operation of the apparatus. If the passage from the air-supply pipe to the chamber 10 of the disk or the like be restricted or shut off by means of the aforesaid cock or valve 29, the vacuum above the disk or the like 11 increases, thus causing the additional air-inlets 31 in the cylinder above to open more rapidly and to a greater extent. If, however, air be allowed to pass through the said cock or valve from the air-supply pipe 30 to the chamber 10 above the disk or the like, the vacuum or force due to suction above the disk 11 is decreased and the additional air-openings above are opened less rapidly and to a lesser extent for the same suction produced by the motor As very slight variations of the vacuum or suction cause considerable variations in the level of the petrol in the nozzle-tube, it is easy to utilize these variations of the level to vary the supply of the petrol in accordance with the vacuum or suction produced. When the motor is starting and running at its lower speeds, the lower aperture or apertures of the nozzle alone supply the petrol; but when the speed and power of the motor increase the apertures above also supply petrol successively until the maximum supply of petrol, and consequently of power, is reached, and then the vacuum or suction is sufficiently high to cause the disk or the like to operate the valve 13' in the cylinder above to fully open the additional air-inlets in the said cylinder above the said disk or the like. The automatic action of the carbureter is thus obtained at the lower powers and vacua or suctions by the different quantities of petrol passing through the nozzle, while at the higher powers and vacua or suctions the automatic action is secured also by the gradual opening of the additional air-inlets in the aforesaid cylinder.

In the modification shown on Fig. 6 the height of the tube-nozzle is reduced. As described for the modification shown on Fig. 4, the vacuum produced by the suction-stroke of the motor causes the petrol to rise in a spraying nozzle or tube provided with several apertures, which supply petrol successively. In the carbureter shown on Fig. 6 a special arrangement is provided, whereby the height of the nozzle or tube is considerably decreased, although the second aperture, hereinafter described, begins to work only when a high vacuum has been created in the carbureter. It is also possible to cause this second aperture to come into action under predetermined conditions, as hereinafter described. The nozzle $2^2$ has only two apertures, 34 being the normal aperture, and 35 the other or second aperture, provided at the top of the spraying nozzle or tube, which extends upward into a chamber 36. Between the spraying nozzle or tube $2^2$ and the wall of an aperture provided in the bottom of the chamber 36, through which operture the said nozzle passes into the said chamber, an annular passage 37, having a definite area in cross-section, is left. The chamber 36 is also provided at top with another aperture 38, the cross-sectional area of which is larger than that of the annular passage 37. If a vacuum is formed in the carbureter, it is obvious that this vacuum tends to cause a certain quantity of air to enter through the aperture 38 and the annular passage 37. As the area of the aperture 38 is greater than that of the annular passage 37 the chamber 36 is subjected to a pressure which is intermediate between atmospheric pressure and the pressure existing inside the carbureter. By varying the area of the aperture 38 relatively to that of the annular passage 37 a predetermined ratio between the vacuum in the chamber 36 and that existing in the carbureter may be secured. This ratio is so chosen that the liquid fuel issues through the opening 35 only under predetermined conditions. In other words, the partial vacuum or kind of expansion thus produced in the chamber 36 has for its object to retard the flow of liquid through the aperture 35. In practice the ratio of the area of the annular passage 37 to the area of the aperture 38 is such that the aperture 35 comes into operation—that is to say, the liquid can only flow therethrough when the additional air-inlet is opened.

Having now particularly described and ascertained the nature of my invention and in what manner the same is to be performed, I declare that what I claim is—

1. A carbureter having a chamber provided with an opening to supply air to the mixing-chamber of an engine, a disk movable in, and free of the wall of, the chamber, said disk being operable by the vacuum created by the engine, a valve to close said opening and operable by the disk when the latter is under the action of the vacuum to uncover said opening, a spindle carrying said disk and provided with a screw, a fixed nut through which the screw extends and with which it engages, and means bearing against the spindle to act against the disk in opposition to the vacuum.

2. A carbureter having a chamber provided with an opening to supply air to the mixing-chamber of an engine, a disk movable in, and free of the wall of, the chamber, said chamber being operable by the vacuum created by said engine, a valve to close said opening and operable by the disk when under the action of the vacuum to uncover said opening, a valve to control the supply of gaseous fluid to the said mixing-chamber, mechanism operable from the disk to actuate said second valve, and a third valve adapted to vary the richness of the explosive mixture independent of the other valves.

3. A carbureter having a chamber provided with an opening to supply air to the mixing-chamber of an engine, a disk movable in and free of the wall of the chamber, said disk being operable by the vacuum created by the engine, a valve to close said opening and operable by the disk when the latter is under the action of the vacuum to uncover said opening, a yieldingly-mounted spindle carrying said disk and provided with a screw, a fixed nut in which the screw engages, and a spring-operated lever bearing against the spindle.

4. A carbureter having a chamber provided with an opening to supply air to the mixing-chamber of an engine, a disk movable in and free of the wall of the chamber, said disk being operable by the vacuum created by the engine, a valve to close said opening and operable by the disk when the latter is under the action of the vacuum to uncover said opening, a yieldingly-mounted spindle carrying said disk and provided with a screw, a fixed nut in which the screw engages, a spring-operated lever bearing against the spindle, and a valve for governing the supply of gaseous fluid to said mixing-chamber and operable by said lever.

In testimony whereof I have hereunto set my hand in presence of two subscribing witnesses.

LOUIS RENAULT.

Witnesses:
EMILE KLOH,
PIERRE LEISLE.